United States Patent [19]
Taylor

[11] 3,729,667
[45] Apr. 24, 1973

[54] PRECISION LEVEL MEASUREMENT AND CONTROL APPARATUS

[75] Inventor: William S. Taylor, Drexel Hill, Pa.

[73] Assignee: FIC Industries, Inc.

[22] Filed: June 17, 1971

[21] Appl. No.: 153,957

[52] U.S. Cl. ..................318/482, 73/313, 73/321, 318/642
[51] Int. Cl. ..............................................G05d 9/00
[58] Field of Search............................318/482, 642; 73/304 C, 313, 321; 33/126.6

[56] References Cited

UNITED STATES PATENTS

| | | | |
|---|---|---|---|
| 3,473,380 | 10/1969 | Mayer et al. | 73/304 C |
| 3,551,740 | 12/1970 | Manners | 318/372 X |
| 2,682,026 | 6/1954 | Mesh et al. | 318/482 X |
| 3,836,739 | 5/1958 | Mesh | 318/482 X |
| 3,473,381 | 10/1969 | Allen, Jr. | 73/313 |

Primary Examiner—Benjamin Dobeck
Attorney—Zachary T. Wobensmith, 2nd

[57] ABSTRACT

The present system includes a plummet or weight which moves in response to gravity to come to rest on the top of the material, in the case of a granular or particulate solid, whose level is being measured, or to determine the upper surface, in the case of a liquid, whose level is being monitored. The plummet is connected to a support menas, such as a perforated tape, which in turn is coupled to drive a counter device. When the plummet stops moving downward the level can be read as a function of shaft position such as by a counter device, a shaft motion transmitter, pulser, or shaft encoder. In addition the support means is coupled to a take-up means which lifts the plummet upward in accordance with a periodic energization of the take-up means. The energization of the take-up means is controlled by a logic circuit which determines the period for the take-up action and the gravity probe.

10 Claims, 9 Drawing Figures

Patented April 24, 1973 3,729,667

INVENTOR
WILLIAM S. TAYLOR

BY
ATTORNEY

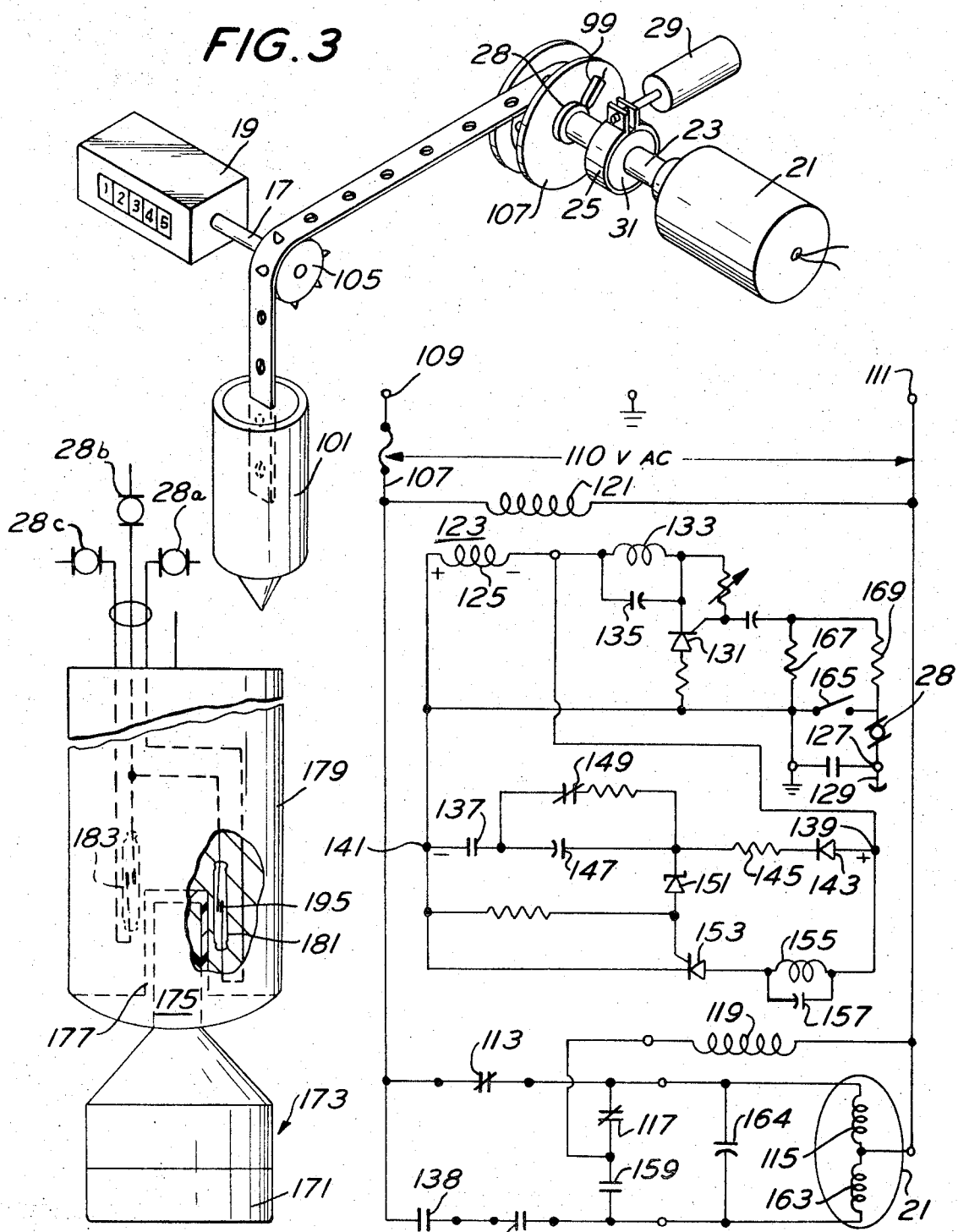

Patented April 24, 1973
3,729,667
4 Sheets-Sheet 4
FIG. 7
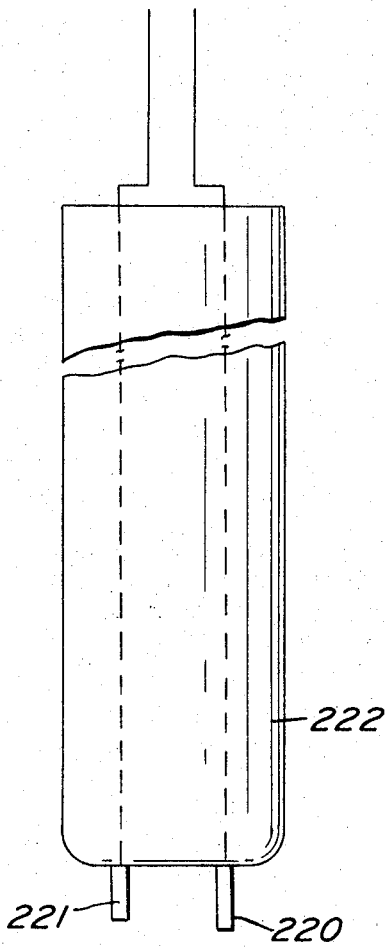
FIG. 8
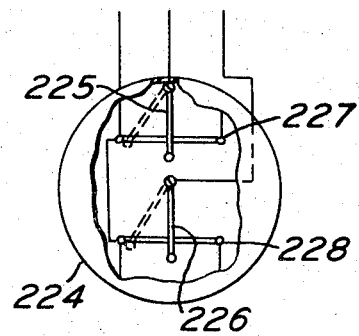
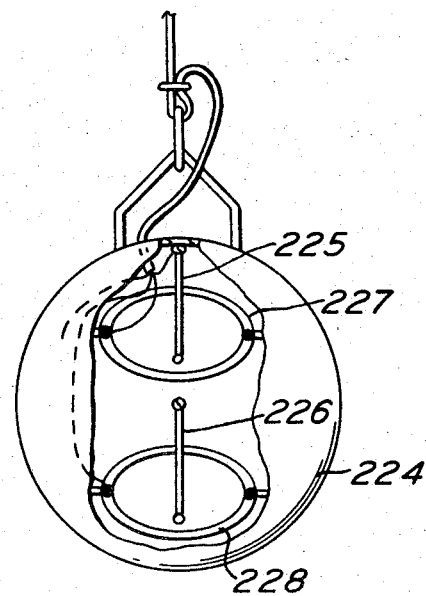
FIG. 9
INVENTOR
WILLIAM S. TAYLOR
BY
ATTORNEY

PRECISION LEVEL MEASUREMENT AND CONTROL APPARATUS

BACKGROUND OF THE INVENTION

1. Field of the Invention

The present invention relates to solid or liquid level measuring devices. In particular the present invention relates to a level measuring device which continually probes or samples the level of the material whose level it is monitoring.

2. Description of the Prior Art

In the prior art there have been efforts made to employ a probe technique by using resonant circuits whose signal strength varied with the proximity of the level of a liquid and other mechanical or electric detecting systems that do not provide accuracy comparable to that obtained with the present invention. These arrangements employ very sophisticated and costly circuits and servomotor systems. The present invention provides the advantages of electronic controls but with a simplicity of logic to enable the system to be "electronically" accurate but relatively economic.

SUMMARY OF THE INVENTION

In accordance with the invention a precision level measuring and control device is provided for liquids or solids which includes a plummet or weight movable downwardly in response to gravity to come to rest on the top of the material, in the case of a granular or particulate solid, whose level is being measured, or to determine the upper surface, in the case of a liquid, by conductivity or a float switch whose level is being monitored, whereby the plummet is lowered by a driven mechanical movement and the level surface is detected by conductivity or float action. The plummet is connected to a support means, such as perforated tape, which in turn is coupled to drive a counter device. When the plummet stops moving downward the level can be read as a function of shaft position such as by a counter device, a shaft motion transmitter, pulser or shaft encoder. In addition, the support means is coupled to a take-up means which lifts the plummet upward in accordance with a periodic energization of the take-up means. The energization of the take-up means is controlled by a logic circuit which determines the period for the take-up action and the gravity probe.

BRIEF DESCRIPTION OF THE DRAWINGS

The objects and features of the present invention will be better understood from the following description taken in conjunction with the drawings wherein:

FIG. 3 is a pictorial schematic of the mechanical part of the system embodiment used to monitor liquids;

FIG. 4 is a circuit schematic of the logic circuitry employed to control the operation of the embodiment shown in FIG. 3;

FIG. 6 is a fragmentary view showing a modified form of plummet;

FIG. 7 is a diagramatic view of another form of plummet with two probes for use with conductive liquids;

FIG. 8 is a diagrammatic view of another ball shaped plummet; and

FIG. 9 is a more detailed view of the plummet of FIG. 8.

DESCRIPTION OF THE PREFERRED EMBODIMENT

Figure 1:
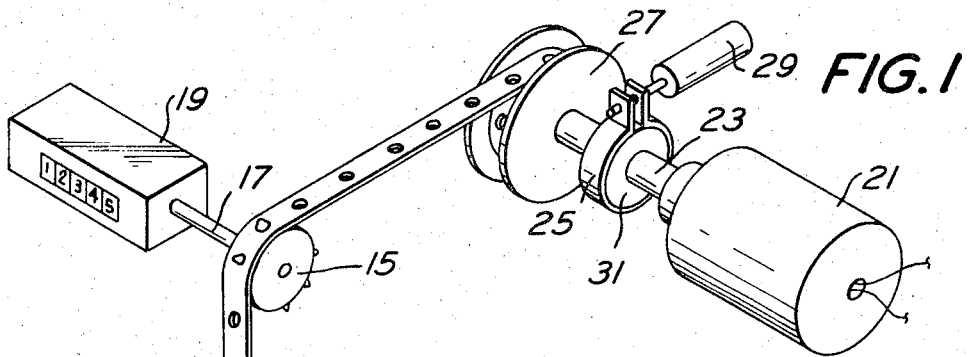
FIG. 1 is a pictorial schematic of the mechanical part of the system embodiment used to monitor solids.

Referring to FIG. 1 there is shown a plummet 11 which is held by a perforated strap 13. In the preferred embodiment the weight or plummet 11 is fabricated from stainless steel and weighs approximately 2½ lbs. It should be understood that the plummet could be fabricated from many other materials such as plastic, brass, or other solid materials which have little tendency to become chemically active with the material whose level is being monitored. It should also be understood that the support means or perforated strap 13 could be any one of a number of support means such as a chain, tape, cable or the like which is formed to be engageable and preferably positively engageable with a drive means to drive a counter or readout device.

In the embodiment shown in FIG. 1, the perforated strap 13 engages the sprocket 15 which is mounted on the shaft 17. When the sprocket 15 turns counter-clockwise in response to the plummet 11 traveling downward (by the force of gravity) the shaft 17 will also rotate counterclockwise thereby causing the counter 19 to decrement or go to a lower number.

It follows that if the plummet 11 travels further downward into the tank, bin or other receptacle, the level of the material must be relatively low and a smaller value must be shown at the window of the counter.

The counter 19 in the preferred embodiment is a Veeder Root counter although many other types of mechanical counters, pulsers, shaft encoders or other devices could be used. When the plummet 11 comes to rest on the solid material the counter 19 will no longer be changing values, as viewed by the user, and hence the level of the solid material will be determined by viewing the value shown on the read out device.

When the plummet 11 is to be raised from the material for a probing action the motor 21 is energized. The shaft 23 of the motor 21 is coupled to a take-up reel 27. A friction brake 25 is carried on the shaft 23. When the motor 21 is energized and when the brake 25 is not closed (to accomplish a braking action), the take-up reel 27 will be driven clockwise and the perforated strap 13 will be wound onto the take-up reel 27 thereby lifting the plummet 11.

The brake 25 is designed to remain open (no braking action) in response to the solenoid 29 being energized. In other words, if the solenoid 29 is energized the motor 21 can drive the take-up reel 27. However, if the solenoid 29 is deenergized, the brake 25 closes and by friction grips the disc 31 to keep the shaft 23 from turning. The disc 31 is also mounted for rotation with the shaft 23.

When the motor is deenergized, gravity of probe 11 will be sufficient to drive motor 21 in a free counter-clockwise rotation. However, said rotation will be braked partially by capacitor 83. Said capacitor and motor inertia and friction are selected so that the probe rate is sufficient to free wheel motor and overcome braking action of capacitor 83. However, when the probe comes to rest on a solid material, braking force of capacitor 83 will be greater than inertia of motor and will prevent shaft from turning within a short time interval. Also the timing circuit is so selected to permit follow-up of changing level in such a manner that if the level of the solid is lowering there is enough time for the probe to be lifted from the surface, the motor to be deenergized, the plummet to lower itself and return past its former level to the lower level. Also, on an increasing level condition the timing is so selected that the plummet 11 can be lifted and relowered at a pace faster than the rising level during the cycle.

Figure 2:
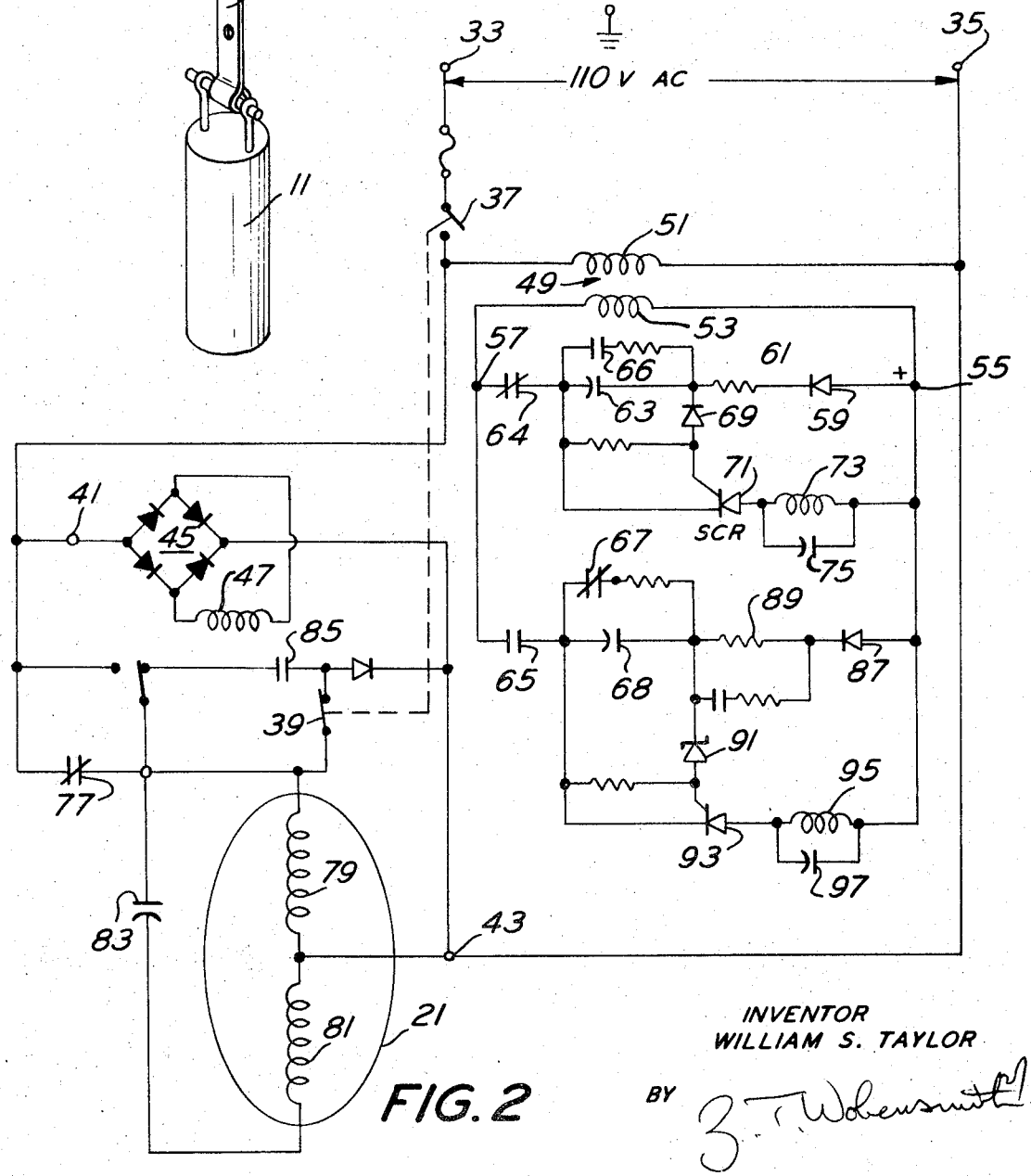
FIG. 2 is a circuit schematic of the logic circuitry employed to control the operation of the embodiment shown in FIG. 1.

A preferred circuitry which controls the motor 21 and the solenoid 29 is shown schematically in FIG. 2. The power is applied to the terminals 33 and 35. when the switch 37 is closed to turn the system on, the switch 39, which is mechanically linked to switch 37, is opened and the significance thereof will become apparent hereinafter.

With the switch 37 closed, there is an alternating current voltage applied across the terminals 41 and 43. This voltage is rectified at the full wave rectifier 45. Accordingly, direct current is applied to the solenoid winding 47 to energize the solenoid and thus keep the brake 25 open.

The solenoid 29 is a fail safe brake solenoid such as manufactured by Simplatrol Co., in the preferred embodiment. Accordinly, unless there is a power failure or the system is turned off, the brake 25 is held open and the motor 21 is able to run freely.

It will be noted that there is a transformer 49 whose primary winding 51 is connected across the terminals 33 and 35. The transformer 49 is a step down transformer and in the preferred embodiment provides 24 volts of alternating current voltage on the secondary winding 53. It should be understood that other voltages can be employed on the secondary winding 53. The voltage developed on the secondary winding 53 is applied to the timing circuit as will be explained.

During the positive half cycle, i.e., when there is a positive voltage at terminal 55 and a negative voltage at terminal 57 there will be current passing through the diode 59, the resistor 61, to charge the capacitor 63, through the normally closed relay contacts 64. The capacitor 63 cannot discharge during the negative half cycle because the normally open relay contacts 66 block one path of discharge and the Zener diode 69 initially blocks another path of discharge. When the capacitor 63 is charged sufficiently, the Zener diode 69 will conduct which in turn biases the silicon controlled rectifier 71 causing the latter to conduct during each positive half cycle that it is so biased. Once the silicon controlled rectifier 71 conducts, it will continue to conduct until the power signal swings negative. Hence during the half cycle that the silicon controlled rectifier 71 conducts the relay 73 is energized and the capacitor 75 is fully charged. During the negative half cycles the capacitor 75 will commence to discharge and keep the relay coil 73 energized to hold the relay contacts in their activated states. When the relay 73 is energized, the relay contacts 65 are closed thus completing circuit continuity for the lower timing circuit. At the same time the relay contacts 67 are opened thereby permitting the capacitor 68 to commence charging.

During the time that the capacitor 63 was having a charge built up thereon, the motor 21 was energized thereby lifting the plummet 11. The operation thereof is as follows. The normally closed relay contacts 77 are part of the relay 73 array. Hence when relay 73 is deenergized the contacts 77 are closed and there is an alternating current voltage across the motor winding 79. Accordingly the motor 21 is energized to lift the plummet 11. The capacitor 83 is a small capacitor which provides two phased operation of the motor to drive the motor 21 in an upward direction.

When the relay 73 is energized the normally closed contacts 77 are opened and the power to the motor windings 79 and 81 is terminated.

At the same time the normally open relay contact 85 are closed and the capacitor 83 discharges through the winding 81 to dynamically brake the motor 21 which is rotating counterclockwise because of the plummet 11 moving downward under the force of gravity.

It should be understood that the relay 73 will remain energized through firing the silicon controlled rectifier 71 on the positive half cycles and discharging the capacitor 75 on the negative half cycles for as long as the relay contacts 64 remain closed. It should also be understood that the motor 21 will be energized to lift the plummet 11 upward for as long a period as it takes the capacitor 63 to become charged sufficiently to fire the Zener diode 69.

When the relay 73 becomes energized the relay contacts 65 become closed and the relay contacts 67 are opened. Accordingly, the capacitor 68 commences charging on the positive half cycles through the diode 87 and the resistor 89. When sufficient charge has been developed across the capacitor 68, the Zener diode 91 will conduct thereby biasing the silicon controlled rectifier 93 so that it conducts. When the silicon controlled rectifier 93 conducts, the relay 95 is energized and the capacitor 97 is fully charged. The operation is similar to the operation described with the upper timing circuit. On each positive half cycles the silicon controlled rectifier 93 will conduct, and on each negative half cycle the capacitor 97 will discharge through the relay coil 95 hence keeping the relay 95 energized for as long as the relay contacts 65 are held closed.

However, the energization of the relay 95 is short lived because once the relay 95 is energized the relay contacts 64 are opened thereby terminating the energization of relay 73. When relay 73 becomes deenergized the relay contacts 65 are opened and the energization of relay 95 is terminated. It should be noted during the last circuit consideration that when relay 95 becomes energized the relay contacts 66 are closed to discharge the capacitor 63 thereby making the upper timing circuit ready for the next cycle of operation. Similarly when relay 73 becomes deenergized the contacts 67 become closed and the capacitor 68 is discharged to make ready for the next cycle of operation.

If the circuit operation is considered it will be apparent that while the capacitor 63 is being charged to a point where it will cause relay 73 to become energized by firing Zener diode 69 and by firing silicon controlled rectifier 71, the motor 21 will be energized thus lifting the plummet 11. When the relay 73 is energized the motor 21 is no longer driven and the plummet 11 drives the motor shaft 23 and the counter shaft 17 in the opposite direction for as long a period as it takes the capacitor 68 to charge to a point where it causes relay 95 to be energized. Obviously if the plummet 11 comes to rest on the solid material before the capacitor 68 is sufficiently charged, the motor shaft and the counter shaft 17 will no longer be rotated counterclockwise and hence the counter 19 will be at rest. Actually the capacitor 68 is chosen to permit the plummet 11 to come to rest so that the read out at the counter 19 or otherwise is in a steady state and the level of the material can be determined.

Referring now to FIG. 3 there is shown a pictorial schematic of the mechanical part of an embodiment which is to be used in monitoring the level of liquids. In FIG. 3 there is a counter 19 which is similar to the counter 19 in FIG. 1, a drive motor 21 which is similar to the drive motor 21 in FIG. 1, a motorshaft 23, a disc 31 coupled thereto, a brake 25, and a solenoid 29 all of which are similar devices to the devices shown in FIG. 1 and therefore bear the same identification numerals. The probe or plummet 101 in FIG. 3 is a probe which is used for detecting the level or levels of a conductive liquid. The perforated strap or tape 103 comprises several strips of metal extruded in a plastic and the metal strips are electrically connected to the probe 101. The sprocket 105 and the take-up wheel 107 are electrically insulated from the tape and the shafts. The probe 101 has electrical insulation along the outside. In addition there is a slip ring 28 on the take up wheel shaft 23 with a brush 98 engaging the ring 28 to provide an electrical path from ground through the liquid in the tank to the control circuit being connected to the slip ring 28.

As in the embodiment shown in FIG. 1 the solenoid 29 when energized will keep the brake 25 open and thereby permit the drive motor 21 to drive the take up wheel 107 to pull the probe 101 up and away from the liquid. If the solenoid 29 becomes deenergized the brake 25 will close and, through mechanical braking friction, grip the disc 31 thereby holding the take up wheel from moving. Electrical braking of motor 21 could also be employed. As was also true in the embodiment shown in FIG. 1, when the perforated tape passes over the sprocket 105 it drives the shaft 17 which will decrement when the probe 101 is going downward in the tank and increment when the probe 101 is moving upward. As will become more apparent in the following description in connection with FIG. 4, the probe 101 is lowered not by gravity but by driving the motor 21 in a downward direction or the counterclockwise direction until the probe 101 comes in contact with the conductive liquid. When the probe 101 comes in contact with the conductive liquid the electrical circuitry connected thereto is held at ground potential and this puts the timing circuits in operation. At the same time the solenoid 29 is deenergized to hold the probe 101 at that level thus enabling the user to read the level of the liquid as shown on the face of the counter 19. In FIG. 4 the circuitry which effects the foregoing operation is shown. Initially the switch 107 must be closed in order to provide the power which is applied to the terminals 109 and 111 to the circuit. When the switch 107 is closed there is electrical current through the normally closed relay contacts 113 through the down winding 115 of the motor 21 to the other side of the line. Hence the motor 21 attempts to drive the probe 101 downward toward the liquid. At the same time there is current through the normally closed relay contacts 113, through the normally closed relay contacts 117, through the solenoid winding 119 to the other side of the line thereby energizing the solenoid 29 keeping the brake 25 disengaged.

Simultaneously there is an a.c. signal applied to the primary winding 121 of the transformer 123. The transformer 123 is a step down transformer as was the transformer 49 and hence there is a lower voltage developed at the secondary winding 125. Initially the probe 101 is being lowered by the motor operation of the motor 21 as just described and when the probe 101 reaches the conductive liquid it provides a ground potential at the terminal 127. It should be understood that the line 129 represents the perforated tape 103.

When the terminal 127 becomes grounded the silicon controlled rectifier 131 becomes biased and therefore turned on during the positive half cycle, i.e., when the voltages are as shown on the secondary winding 125 in the figure. Accordingly, the silicon controlled rectifier 131 conducts to energize the relay 133 and at the same time charge the capacitor 135. As was described in connection with the earlier circuits, during the negative half cycles the capacitor 135 discharges through the relay coil 133 thereby keeping the relay energized. For each succeeding positive cycle the silicon controlled rectifier 131 conducts as long as the probe 101 is resting in the conductive liquid.

When the relay 133 becomes energized, the relay contacts 113 open thereby terminating the power to the down winding 115 while the normally open relay contacts 138 close. At the same time the power is terminated to the solenoid winding 119 and the brake 25 acts to hold the take up wheel in a fixed position. Additionally, at the same time, of course, the sprocket 105 has been moved to decrement the counter 119 so that the user can view the value through the counter window and determine the level of the liquid.

The lower timing circuit is also put into operation with the energization of the relay 133. When the relay 133 becomes energized, the relay contacts 137 are closed and hence there is current flow during the negative half cycles (which actually provides a voltage as shown between the terminals 139 and 141 in the drawing) from the terminal 139, through the diode 143, through the resistor 145, to charge the capacitor 147. The energization of the relay 133 opens the relay contacts 149 and hence there is no discharge path for the capacitor 147 at this time. Accordingly there is a voltage developed on the capacitor 147 and when this voltage is sufficiently high, the Zener, diode 151 conducts thereby biasing the silicon controlled rectifier 153 which will conduct during the negative half cycles (as just defined). When the silicon controlled rectifier 153 conducts, the relay 155 will be energized and the capacitor 157 will be fully charged. As was described in connection with the relays 73, 95 and 144, during the half cycles when proper energizing potential is not applied across the relay, the capacitor 157 will discharge thereby keeping the relay 155 energized.

When the relay 155 becomes energized the normally closed relay contacts 117 will open and the normally opened relay contacts 159 and 161 will become closed.

Accordingly, there is now current flow through the normally opened contacts 138 and 161 to the "up" winding 163 to cause the motor 21 to rotate in a clockwise direction thereby lifting the probe 101 from the conductive liquid. It should be noted that closing contacts 159 enables the brake solenoid winding 119 to be energized. When the motor 121 is energized in the upward direction, the probe 101 is lifted from the conductive liquid and hence the terminal 127 is no longer at ground potential. During the following negative half cycle the conduction of the silicon controlled rectifier 131 is terminated and hence the relay 133 becomes deenergized.

When the relay 133 is deenergized the normally closed relay contacts 113 once again become closed and the normally open relay contacts 138 once again become opened. With the action of the last two sets of relay contacts, it becomes apparent that with the closing of the normally closed relay contacts 113 the down winding 115 will become energized and hence the motor would tend to drive downward. However, with the opening of the relay contacts 138 the circuit path through the relay contacts 138, 161, 159 to the solenoid winding is broken and hence the brake 25 holds the take up wheel against this tendency to drive the motor ownward.

With the deenergization of the relay 133, the contacts 137 will once again become opened and hence the relay 155 will become deenergized. When the relay 155 becomes deenergized the normally closed relay contacts 117 return to their normally closed condition thereby providing a current flow through the normally closed relay contacts 113, through the normally closed relay contacts 117, through the solenoid 119 to the other side of the line thereby energizing the solenoid 29 and permitting the motor 21 to move the probe downward. In actual operation there is a virtual overlap between the transfer of the energization of the solenoid from the circuit path through the normally closed contact 117 and the circuit path through the normally opened contact 159 so that the motor 21 responds to the change of direction in accordance with the deenergization of the relay 133.

The capacitor 164 is provided in the circuit to provide two phase motor operation. It will be noted that there is a switch 165 in the upper part of the timing circuit which puts the resistances 167 and 169 is parallel. The switch 165 is provided in order to manually raise the plummet to check the system operation.

A different type probe or plummet 179 may be used with the last described mechanical device in order to provide a means for reading both solid and liquid levels, conductive and non-conductive, and with slightly modified logic circuitry to accomplish the electronic controls. The probe 179 is shown in FIG. 6. Mounted for insertion into the probe 179 is the plunger 173. Plunger 173 has a permanent magnet 175 mounted in its upper section and has a float 171 mounted on its lower section. If the probe is to be used for measuring solid materials the float 171 of course will be a weight. The plunger 173 is mounted in the channel 177 for movement upward and downward within that channel. Mounted along side the channel 177 in the probe 179 is a lower reed switch 181 and an upper reed switch 183.

If the probe 179 is to be used to measure the level of solid material, then the probe is lowered as was described in connection with the probe 101 when the weight 171 comes in contact with the level of the solid, the plunger 173 is moved upward in the channel 177 so as to close the contacts of the reed switch 181. The closing of the contacts of the reed switch 181 is similar to providing ground potential at the terminal 127 in FIG. 4. And hence it is apparent that this type of probe could be used in place of the probe 101 for effecting the measurement of non-conductive liquids or solid materials. In either case the float or the weight would close the reed switch 181 which would provide ground potential at the terminal 127 and the remainder of the circuit would operate quite similarly.

Figure 5:
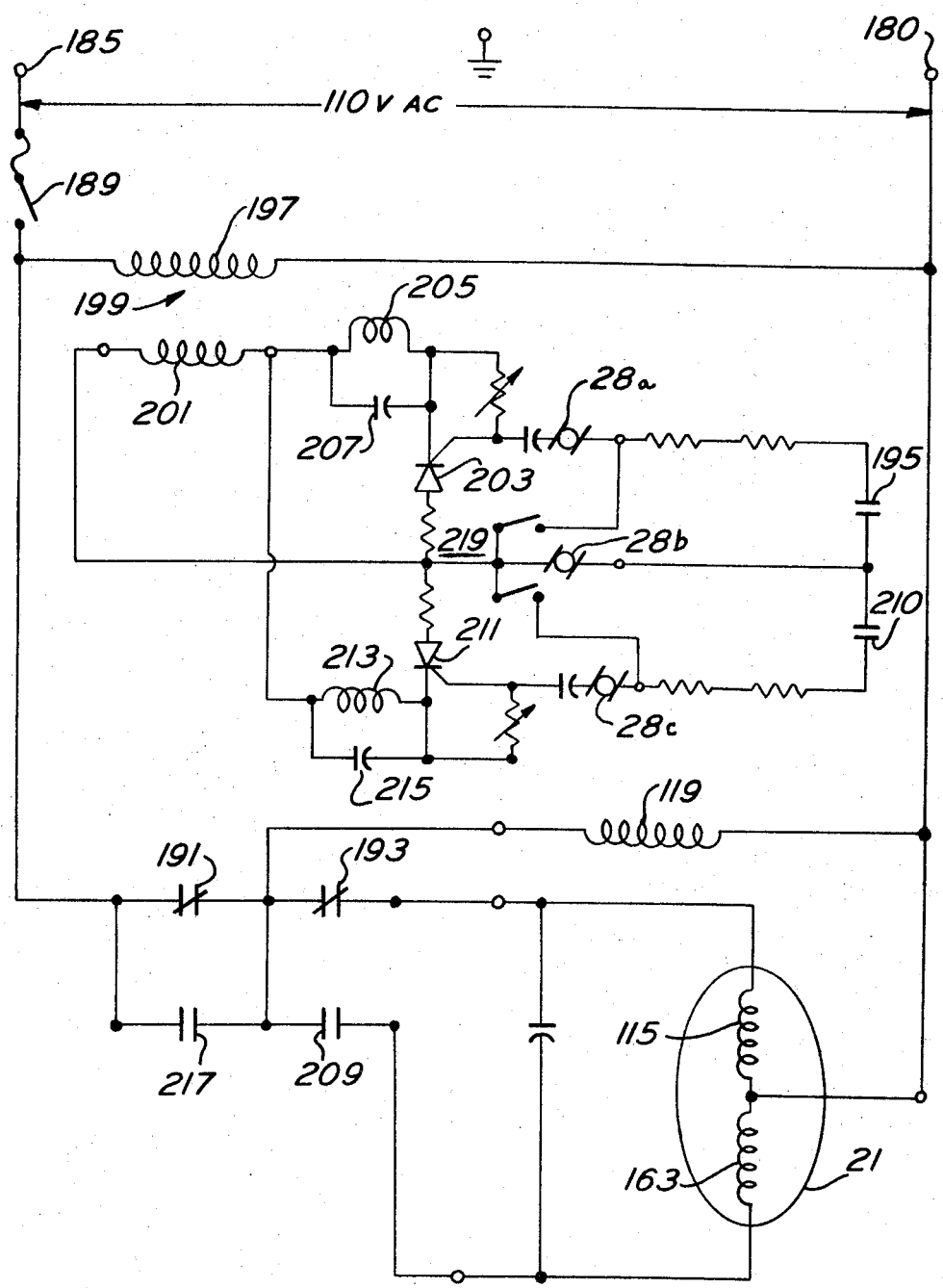
FIG. 5 is a circuit schematic of the logic circuitry to monitor liquids with plummet in FIG. 6.

In FIG. 5 there in shown circuitry to be used with the probe 179 when both the lower reed switch 181 and the upper reed switch 183 are employed. In FIG. 5 the power signal is applied to the terminals 185 and 180. When the switch 189 is closed there is current flow through the normally closed relay contacts 191 through the normally closed relay contacts 193, through the down winding 115 to the other side of the circuit thereby causing the motor 21 to rotate counterclockwise thus lowering the probe 179 as was described in connection with the description of the device in FIG. 3. At the same time there is current flow through the normally closed relay contacts 191 through the solenoid winding 119 so that the brake 25 remains opened thus permitting the motor to rotate as just described.

When the probe 179 has been lowered sufficiently far so that the float 171 comes in contact with the liquid the plunger 173 will be moved upward in the channel 177 thus closing the contacts 195 of the reed switch 181. It should be apparent from the circuitry of FIG. 5 that there will be power applied to the primary winding 197 of the transformer 199 to develop a lesser voltage on the secondary winding 201.

When the contacts 195 of the lower reed switch 181 are closed this will bias the silicon controlled rectifier 203 thereby causing it to conduct during the positive half cycles which are developed upon the secondary winding 201. The positive half cycle will be defined as the voltage shown in FIG. 5 on the secondary winding 201.

When the silicon controlled rectifier 203 conducts, the relay 205 will be energized and the capacitor 207 will be fully charged. As was described earlier during the negative half cycles the discharge operation of the capacitor 207 will keep the relay coil 205 energized thereby causing the relay to be energized as long as the silicon controlled rectifier is conducting during the succeeding positive cycles.

When the relay 205 is energized the normally closed contacts 191 will be opened and the normally opened contacts 209 will be closed. When the normally closed contacts 191 are opened the current flow to the down winding 115 and to the solenoid winding 119 will be terminated. Hence the motor 21 will stop driving the probe 179 downward and at the same time the brake 25 will hold the take up wheel in a fixed position thereby enabling the user to view the counter 19 and see the level of the liquid being monitored. As the liquid raises by virtue of additional liquid being put into the holder or tank, the plunger 173 will move further into the channel 177 thereby closing the contact points of the reed switch 183. when the contact points 210 of the upper reed switch 183 are closed, the silicon controlled rectifier 211 will be biased to conduct, during the positive cycles, thereby energizing the relay 213 and charging the capacitor 215. Accordingly, as similarly described earlier, the relay 213 will remain energized as long as the silicon controlled rectifier is conducting during the positive half cycles. When the relay 213 is energized, the normally closed contacts 193 will be opened and the normally opened contacts 217 will be closed. When the normally opened contacts 217 close, there will be current through the normally opened contacts 217, through the normally open contacts 209 to the "up" winding 163, thereby causing the motor to rotate in a clockwise direction thus lifting the probe 179 upward. When the probe 179 has reached a point where the float 171 is resting on the surface of the liquid, the plunger 173 will have moved downward in the channel 177 thereby opening the contacts 210 of the upper reed switch 183. When this occurs the silicon controlled rectifier 211 will no longer conduct on the succeeding positive cycle and hence the normally open contacts 217 will again become open and the normally closed contacts 193 will become closed. However, at this time the relay 205 is still energized and hence the normally closed contacts 191 are open, therefore, the solenoid 119 is de-energized thereby holding the probe at the new acquired level which can be determined from reading the value indicator on counter 19.

If on the other hand the liquid level should be lowered thus permitting the plunger to fall downward in the channel 177, thus opening the contacts 195, there would result an activation of the downward winding 115. If the contacts 195 are opened the silicon controlled rectifier 203 will stop conducting on the next positive cycle following thereafter, thus deenergizing the relay 205 which will permit the normally closed contacts 191 to close, thus providing current flow through normally closed contacts 191, normally closed contacts 193 and the downward winding 115 thus causing the motor ro drive the take up wheel in a counterclockwise direction lowering the probe toward the falling liquid.

The switch 219 is for the purpose of manually operating the system to lift the probe to some predetermined level for starting or checking the operation. It should also be understood that if the liquid is turbulent the capacitors 207 and 215 may be increased to provide a suitable time delay in the operation of the relays 205 and 213 thereby damping the effect of the turbulence of the liquid.

In this case three conductors in the perforated tape are used. Additional conductors are provided in the tape to measure the temperature of the liquid by means of a resistance bulb, thermocouple, or thermostat imbedded in the plummet. Two other probe variations can also be used with the same circuitry in FIG. 5 and the plummet configuration as in FIG. 6. In FIG. 7 contacts similar to 183 and 145, are made when the upper and lower probes 221 and 220 of plummet 222 come in contact with a conductive liquid.

In the case of a non-conducive liquid the plummet 224 shown in FIGS. 8 and 9 can be employed. Two pendular contacts 225 and 226 are provided to engage cylindrical conductive sleeves 227 and 228. The plummet 224 is a ball and rotates as it becomes buoyant and is lowered into the liquid to be measured.

I claim:
1. A system for monitoring a level of material held in a receptacle comprising in combination:
   probe means;
   flexible support means comprising a perforated tape connected to support said probe means and formed to engage readout means;
   readout means engaged with said perforated tape driven directly in response to said probe means moving downwardly and upwardly in said receptable;
   take-up means coupled to said flexible support means and adapted to move said flexible support means in a first direction in said receptacle and alternatively to move said flexible support means in a second direction in said receptacle;
   brake means coupled to said take-up means to hold said take-up means stationary when said brake means is activated; and
   control circuit means for raising said probe means and lowering said probe means for level monitoring including
   first control circuit means including a first switching means connected thereto coupled to said take-up means and said brake means to enable said take-up means to move said flexible support means in a first direction until said first switching means is turned on responsive to a level condition to energize said first switching means which terminates the movement of said take-up means in said first direction whereby said readout means will make available the value of the level of the material being monitored when said probe is not moving in either said first or said second directions, and
   second control circuit means including a second switching means coupled to said take-up means and said brake means to enable said take-up means to move said flexible support means and said probe means in a second direction for a predetermined time until said second switching means is turned on thereby enabling the termination of the movement of said take-up means in said second direction and reversing the movement to a movement in said first direction.

2. A system for monitoring the level of material according to claim 1 wherein
   said flexible support means includes electrically conductive means and wherein
   said probe means is an electrically conductive means and is electrically connected to said flexible support means and wherein
   said take-up means includes means connecting said flexible support means to said first and second control circuit means.

3. A system for monitoring the level of material held in said receptacle according the claim 2 wherein
   said first switching means comprises a silicon controlled rectifier whose anode is connected to a first potential and whose control element is connected to said flexible support means and whose cathode is connected to said first switching means and wherein said housing means is connected to said first potential whereby when said probe means comes in contact with a conductive liquid said silicon controlled rectifier will be biased for conduction thereby energizing said first switching means.

4. A system for monitoring a level of material according to claim 3 wherein said first switching means is normally open and wherein said second control circuit includes a first capacitor connected through said last mentioned normally open circuit on one side and through a Zener diode and a second silicon controlled rectifier on said other side and wherein the anode of said last mentioned silicon controlled rectifier is connected to said second switching means whereby when said first switching means is energized said first capacitor commences to charge until such time as there is sufficient charge developed thereacross to cause a second silicon controlled rectifier to conduct by virtue of bias through said Zener diode, thereby energizing said second switching means.

5. A system for monitoring the level of material according to claim 4 wherein said take-up means includes a motor having at least first and second windings and a capacitor, said capacitor being connected to said first winding causing said motor to rotate in such a manner as to drive said probe downward and said capacitor connected to said second winding causing said motor to drive so as to pull said probe upward and wherein there is circuitry connected to said first and second windings including switching closures associated with said first and second switching means such that when neither switching means is energized said motor will be driving said probe downward and when said first switching means is energized certain of said switching closures associated therewith will be open and certain others will be closed to terminate said downward movement and simultaneously cause said brake means to hold said take-up means stationary and whereby when said second switching means becomes energized certain of said other switching closures will be open and certain of said other switching closures will be closed causing said motor to rotate so as to pull said flexible support means and said probe upwards.

6. A system for monitoring the level of material according to claim 1 wherein said first control circuit includes a first capacitor whose charge circuit passes through the normally closed closures of said second switching means and wherein said first switching means comprises a first silicon controlled rectifier connected to said first capacitor and to said first switching means such that when there is a sufficient charge developed on said capacitor said first silicon controlled rectifier will conduct thereby energizing said first switching means and wherein said second control circuit includes a second capacitor connected through the normally open closures of said first switching means and wherein said second switching means comprises a second silicon controlled rectifier connected to said second capacitor and further connected to said second circuit such that when said first switching means is energized thereby closing the said normally opened closures associated therewith said second capacitor will commence having a charge developed thereon and when said charge is sufficiently great said second silicon controlled rectifier will commence to conduct thereby energizing said second switching means which in turn causes said first mentioned normally closed closures to be open thereby de-energizing said first switching means.

7. A system for monitoring the level of materials according to claim 6 wherein said take-up means includes a motor having at least first and second windings and a capacitor, said capacitor connected with said first winding driving said motor in a direction to lower said probe and said capacitor connected to said second winding driving said motor in a direction to lift said probe and wherein there is circuitry connected to said first and second windings including normally closed closures of said first switching means whereby while said first capacitor is being charged said take-up means will rotate in a direction to lift said probe and whereupon the energization of said first switching means will open said last mentioned normally closed contacts permitting said take-up means to lower said probe by the force of gravity for as long a period of time as it takes to energize said second switching means.

8. A system for monitoring the level of materials according to claim 1 wherein said probe means includes a plunger means having a permanent magnet in the upper portion thereof and wherein said probe means further includes first and second reed switches disposed such that when said plunger comes in contact with the material to be monitored said plunger will advance into said probe in proximity of said first reed switch thereby closing the contacts of said first reed switch to activate said first switching means and whereby if the level of said material increases said plunger will advance further into said probe to close the contacts of said second reed switch thereby activating said second control circuit.

9. A system for monitoring the level of material according to claim 8 wherein said first switching means comprises a first silicon controlled rectifier whose control element and anode element are connected across said first reed switch and whose cathode is connected to said first switching means whereby when said first reed switch is closed said first silicon controlled rectifier conducts thereby energizing said first switching means and whereby said second switching means comprises a second silicon controlled rectifier whose control element and anode are connected across said second reed switch and whose cathode is connected to said second switching means whereby when said second reed switch is closed said second silicon controlled rectifier conducts thereby energizing said second switching means.

10. A system for monitoring the level of material according to claim 9 wherein said take-up means includes a motor having first and second windings and a capacitor wherein said capacitor connected to said first winding will cause said take-up means to rotate in one direction and said capacitor connected to said second winding will cause said take-up means to rotate in a second direction and wherein there is circuitry connected to said first and second windings including normally open and normally closed closures of said first and second switching means such that when either switching means is energized said capacitor connected to said first winding of said motor will be energized to drive said probe downward and whereby when said first switching means is energized the movement of said take-up means downward will be terminated and said brake means will hold said take-up means stationary and whereby when said second switching means is energized said capacitor connected to said second winding will be energized to cause said motor to move upward and said brake means will be released to permit said movement.

* * * * *